US010931929B2

United States Patent
Yi

(10) Patent No.: US 10,931,929 B2
(45) Date of Patent: Feb. 23, 2021

(54) METHOD AND SYSTEM OF DISCRIMINATIVE RECOVERY OF THREE-DIMENSIONAL DIGITAL DATA OF A TARGET OF INTEREST IN A CLUTTERED OR CONTROLLED ENVIRONMENT

(71) Applicant: Xyken, LLC, Vienna, VA (US)

(72) Inventor: Steven Yi, Vienna, VA (US)

(73) Assignee: XYKEN, LLC, Vienna, VA (US)

( * ) Notice: Subject to any disclaimer, the term of this patent is extended or adjusted under 35 U.S.C. 154(b) by 74 days.

(21) Appl. No.: 16/212,964

(22) Filed: Dec. 7, 2018

(65) Prior Publication Data
US 2020/0186773 A1  Jun. 11, 2020

(51) Int. Cl.
H04N 13/122 (2018.01)
H04N 13/221 (2018.01)
G06T 7/194 (2017.01)
G06T 7/246 (2017.01)

(52) U.S. Cl.
CPC .......... H04N 13/122 (2018.05); G06T 7/194 (2017.01); G06T 7/246 (2017.01); H04N 13/221 (2018.05); G06T 2207/10021 (2013.01); G06T 2207/20104 (2013.01)

(58) Field of Classification Search
CPC .... H04N 13/122; H04N 13/221; G06T 7/194; G06T 7/246; G06T 2207/20104; G06T 2207/10021; G06T 7/11; G06T 7/593
See application file for complete search history.

(56) References Cited

U.S. PATENT DOCUMENTS

| 2018/0205941 | A1* | 7/2018 | Kopf ...................... H04N 13/15 |
| 2018/0276885 | A1* | 9/2018 | Singh ....................... G06T 17/00 |
| 2019/0066372 | A1* | 2/2019 | Falk-Wallace .......... G06T 17/05 |
| 2019/0094981 | A1* | 3/2019 | Bradski ............. G02B 27/0093 |
| 2019/0116322 | A1* | 4/2019 | Holzer .................... G06T 13/40 |

OTHER PUBLICATIONS

Ken Joy, Ray Tracing, Lecture 15, UC Davis Academics, https://www.youtube.com/watch?v=Ahp6LDQnK4Y, dated Dec. 19, 2014, accessed Apr. 27, 2020.*

* cited by examiner

*Primary Examiner* — Michael J Hess

(57) ABSTRACT

A method of discriminative recovery of three-dimensional digital data of a target of interest in a cluttered or controlled environment. The method uses the traditional structure from motion (SFM) 3D reconstruction method on a video of a target of interest to track and extract 3D sparse feature points and relative orientations of the video frames. Desired 3D points are filtered from the 3D sparse feature points in accordance to a user input and a digital cutting tool. Segmented images are generated by separating the target of interest from the background scene in accordance to the desired 3D points. A dense 3D reconstruction of the target of interest is generated by inputting the segmented images and the relative orientations of the video frames.

8 Claims, 22 Drawing Sheets

METHOD AND SYSTEM OF DISCRIMINATIVE RECOVERY OF THREE-DIMENSIONAL DIGITAL DATA OF A TARGET OF INTEREST IN A CLUTTERED OR CONTROLLED ENVIRONMENT

FIELD OF THE INVENTION

The present invention relates generally to three-dimensional reconstructive applications. More specifically, the present invention is a method and system of discriminative recovery of three-dimensional digital data of a target of interest in a cluttered or controlled environment.

BACKGROUND OF THE INVENTION

There are many methods of reconstructing or obtained three-dimensional (3D) surface information of a target through image processing or computer vision algorithms. Typical methods include structure from motion (SFM), structured light, and time of flight (TOF). A common problem with these methods is that the obtained 3D result always has unwanted background reconstructed along with the target of interest. This is true no matter whether obtained 3D result is in a controlled or uncontrolled environment. In many applications such as reverse engineering or 3D modeling, medical device customizing for human limbs such as customized foot inserts or shoes, and wound area or volume growth monitoring over time, it is important to isolate the 3D data from the target of interest from the unwanted background. As a result, in order to obtain the 3D data only on the target of interest, either a manual process (e.g. digital tool cut) or automatic process (e.g. image processing algorithms) is needed to get rid of the unwanted background or information. The manual process can be very tedious or the automatic 3D algorithms often fail to do the job especially for complex background or complex 3D surface boundaries with the unwanted regions. In addition, for the SFM based approach, the recovered 3D data is unscaled.

It is therefore an objective of the present invention to provide a method and system of discriminative recovery of three-dimensional digital data of a target of interest in a cluttered or controlled environment. The present invention only reconstructs or recovers the 3D data from the target of interest with a recorded video through a computer vision method. Using the present invention, the reconstruction of the unwanted background or area is avoided. The method of the present invention increases efficiency and accuracy of the process due to the following reasons. The first reason being that no 3D computation process is allocated for the unwanted background. The second reason being that there is no need to worry about separating the target of interest from the unwanted background at the connected areas. The final reason being that no error is introduced as from the traditional processes of removing the spurious data using digital tool cut. Additionally, the method of the present invention includes a process to automatically recover the 3D scale of the target of interest.

DETAIL DESCRIPTIONS OF THE INVENTION

All illustrations of the drawings are for the purpose of describing selected versions of the present invention and are not intended to limit the scope of the present invention.

Figure 1:
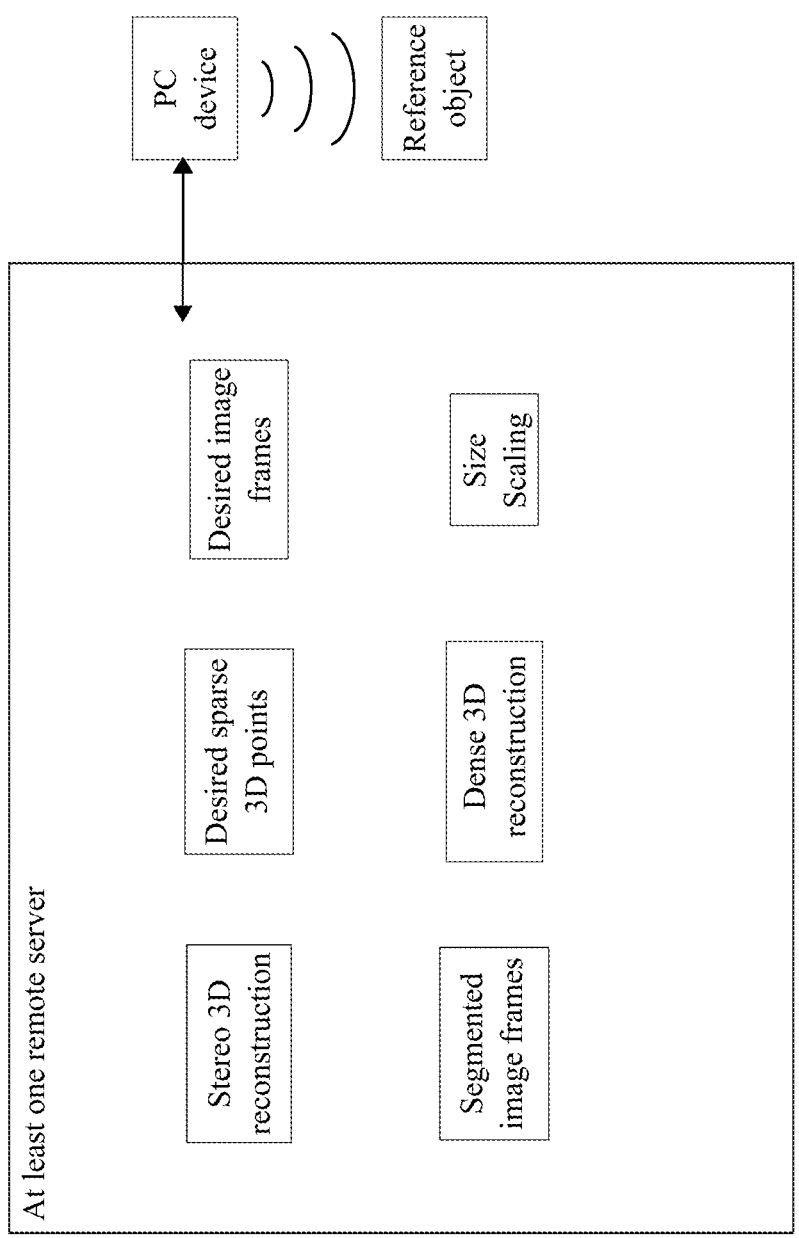
FIG. 1 displays a diagram of the system of the present invention.
Figure 2:
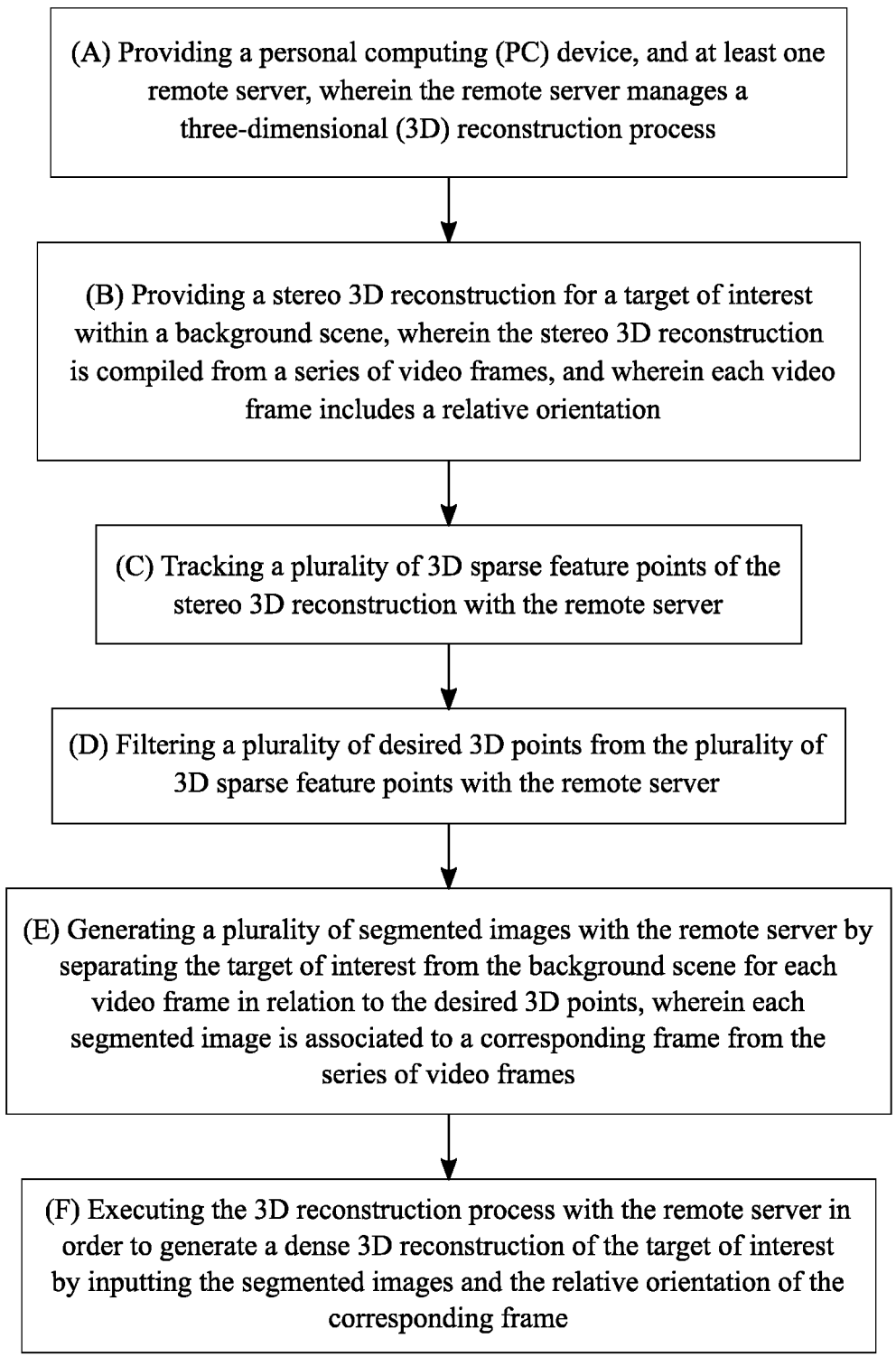
FIG. 2 is a flow chart illustrating the overall method of the present invention.

The present invention is a method and system of discriminative recovery of three-dimensional (3D) digital data of a target of interest in a cluttered or controlled environment. In further detail, the present invention is a software application that provides an efficient reconstruction of 3D information of a target of interest 1. In reference to FIG. 1, the system of the present invention is provided with a personal computing (PC) device and at least one remote server. With reference to FIG. 2, the at least one remote server is used to manage the 3D reconstruction process (Step A). The 3D reconstruction process is a series of steps in order produce a 3D model of a target of interest. Additionally, the at least one remote server is used to process and manage information such as, but not limited to, video files or user input information. The PC device allows a user to interact with the present invention. The PC device may be any type of computing device such as, but not limited to, a mobile phone device, personal desktop, or a mobile tablet device. Furthermore, a video-recording device is preferably integrated into the PC device.

In reference to FIG. 2, the method of the present invention follows an overall process that provides an efficient reconstruction of 3D information of a target of interest 1. A stereo 3D reconstruction is provided for a target of interest 1 within a background scene. The target of interest 1 may be any physical object that can be reconstructed as a 3D model. The background scene is unwanted physical area in which the target of interest 1 is positioned. The stereo 3D reconstruction is a method which identifies and extracts points from images. The stereo 3D reconstruction is compiled from a series of video frames, and each video frame includes a relative orientation (Step B). In further detail, the stereo 3D reconstruction is compiled from the 3D sparse features tracked from the series of video frames. Additionally, the relative orientation of each video frame is obtained through the stereo 3D reconstruction process and is the orientation of each video frame in relation to each other. The series of video frames is acquired from a video file which can be provided by any video-recording device such as, but not limited to, a camcorder or camera. The video file may also be provided by the PC device if a video-recording device is integrated into the PC device. The video file is a recorded file of the target of interest 1. Furthermore, the relative orientation of each video frame is different poses of the video-recording device. The stereo 3D reconstruction is produced using traditional multi-view 3D structure form motion (SFM) reconstruction algorithms. After the stereo 3D reconstruction is produced, the remote server tracks a plurality of 3D sparse feature points 7 of the stereo 3D reconstruction (Step C). The plurality of 3D sparse feature points 7 are feature points which are detected from image points of the series of video frames. The plurality of 3D sparse feature points 7 is stored on the remote server. Consequently, the remote server filters a plurality of desired 3D points 11 from the plurality of 3D sparse feature points 7 (Step D). The plurality of desired 3D points 11 are 3D sparse points that isolate the target of interest 1. The plurality of desired 3D points 11 is stored on the remote server. Afterwards, the remote server generates a plurality of segmented images by separating the target of interest 1 from the background scene for each video frame in relation to the desired 3D points 11. (Step E). Each segmented image is associated to a corresponding frame from the series of video frames. The plurality of segmented images is a set of images that only include the target of interest 1. That plurality of segmented images is stored on the remote server. Finally, the remote server executes the 3D reconstruction process in order to generate a dense 3D reconstruction of the target of interest 1 by inputting the segmented images and the relative orientation of the corresponding frame (Step F). The dense 3D reconstruction is a process which produces a 3D model of a target of interest 1 without any background scene.

Figure 3:
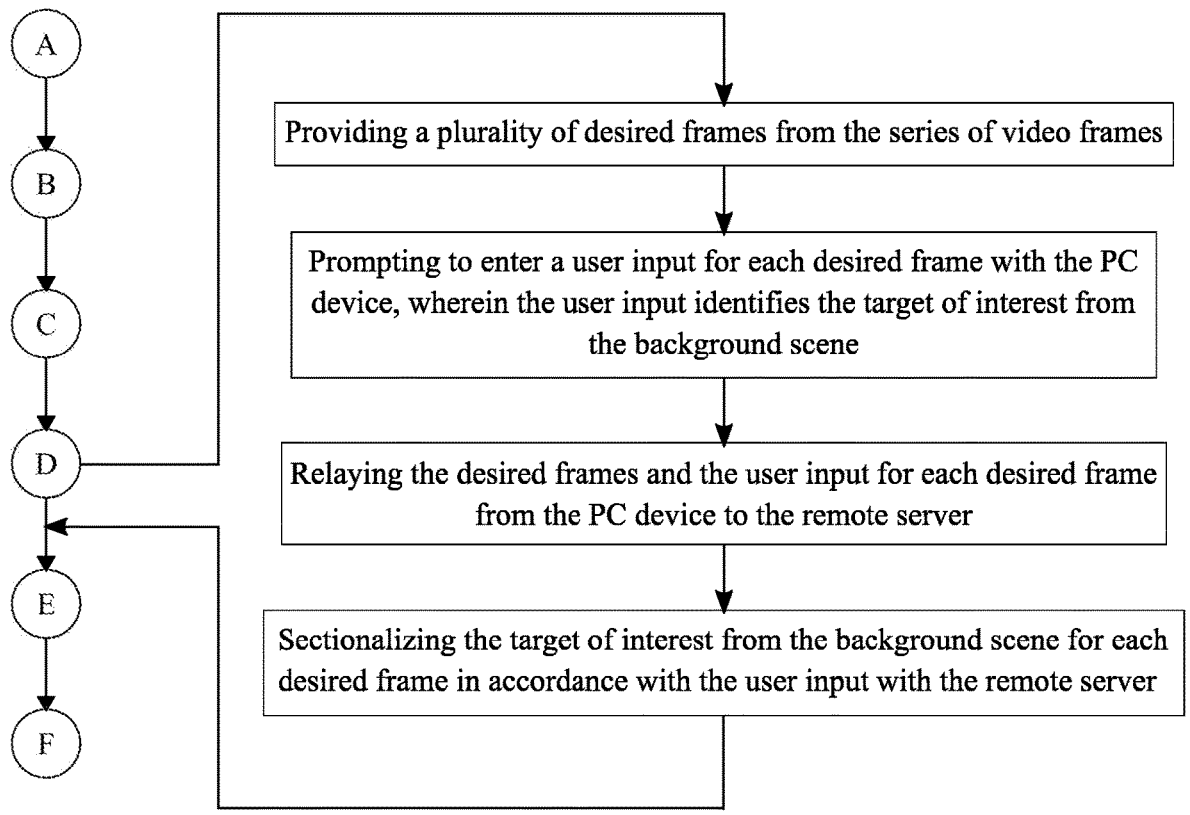
FIG. 3 is a flow chart illustrating the sub-process of sectionalizing the desired frames in accordance with the user input.
Figure 4:
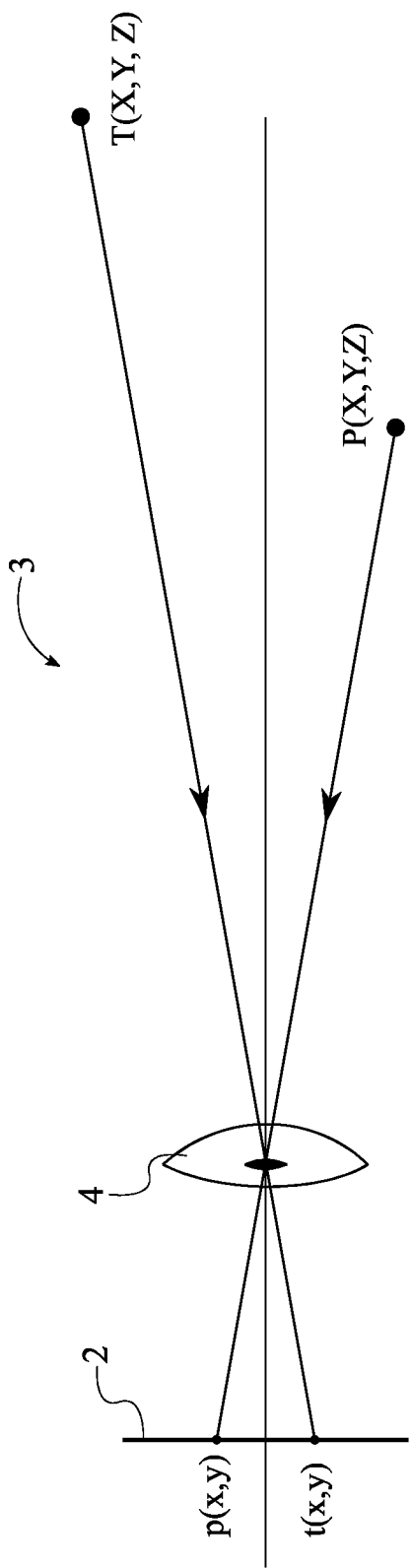
FIG. 4 is a diagram illustrating the 3D to 2D imaging optical ray tracing principle.
Figure 5:
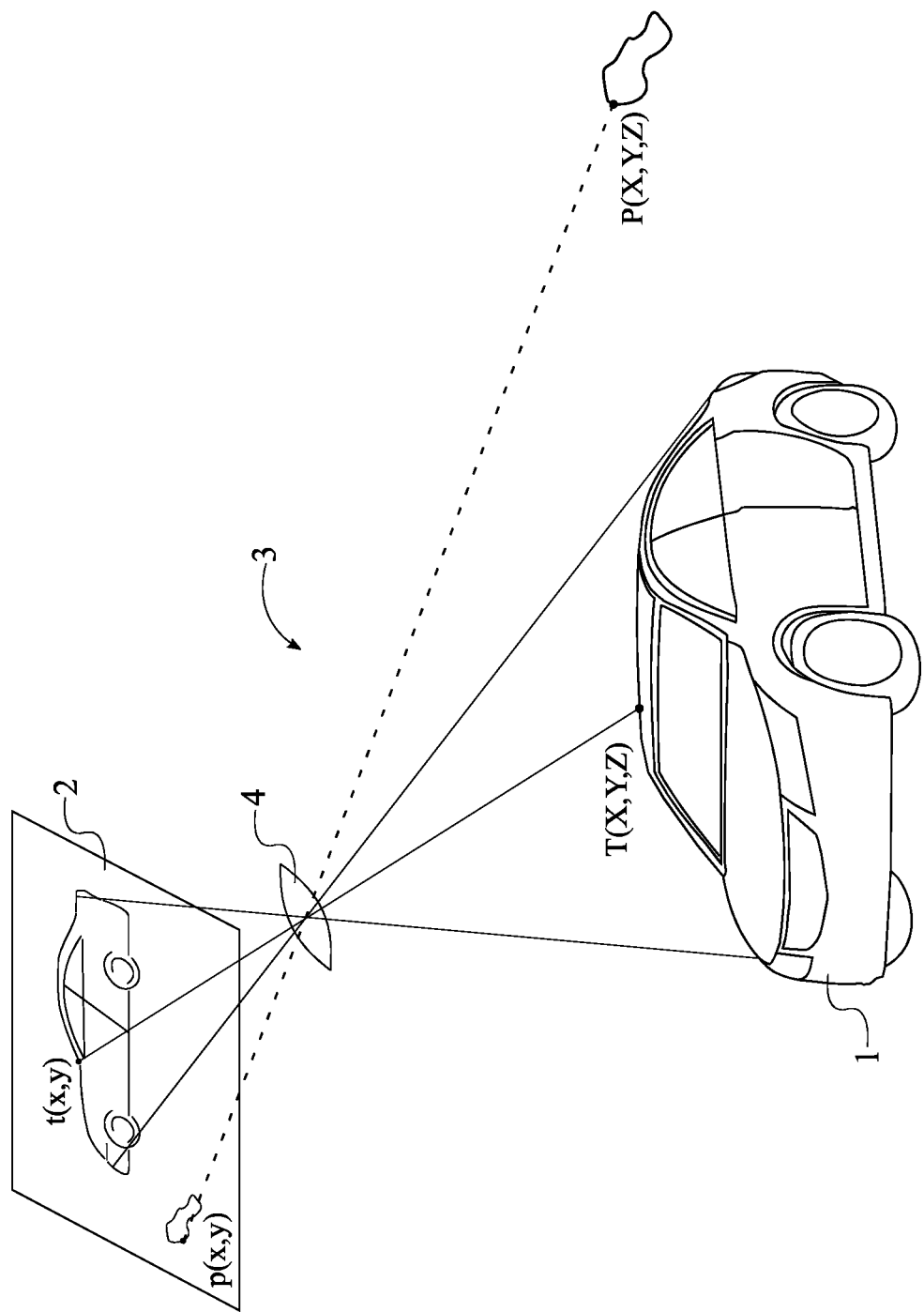
FIG. 5 is a diagram illustrating 3D to 2D projection to form an image.

With reference to FIG. 3, a sub-process following the method provides a plurality of desired frames from the series of video frames. The plurality of desired frames is a set of frames which includes views that are able to three-dimensionally define the target of interest 1. The plurality of desired frames is stored on the remote server. The PC device displays the plurality of desired frames and prompts to enter a user input for each desired frame. The user input identifies the target of interest 1 from the background scene. The desired frames and the user input for each desired frame is relayed from the PC device to the remote server. Subsequently, the remote server sectionalizes the target of interest 1 from the background scene for each desired frame in accordance with the user input. In the preferred embodiment of the present invention, the remote sever, with aid from the user input, uses a segmentation algorithm to sectionalize the target of interest 1 from background scene for each of the plurality of desired frames. Specifically, the segmentation algorithm is GrabCut which is an innovative segmentation algorithm that performs segmentation based on both the region and boundary information. Consequently, the remote sever generates a plurality of 2D segmented frames from each of the plurality of desired frames. With reference to FIGS. 4 and 5 and using the plurality of 2D segmented frames and 3D to 2D imaging optical ray tracing principle, the 3D sparse feature points 7 from the background scene are filtered out and the plurality of desired 3D points 11 are obtained. In further detail, 3D to 2D projecting the 3D sparse feature points 7 belonging to the target to the image plane 2, through optical ray tracing 3, the desired 3D points 11 must fall within the target of interest 1. With the perspective video-recording device model, the relationship between a 3D point T(X,Y,Z) and its 2D image point t(x,y) is given by the lens equations: $x=f*X/Z$, $y=f*Y/Z$, where f is the lens 4. Optical ray tracing 3 and lens equations determines the one to one mapping between the 3D target points to its generated 2D image points. Any 3D object away from the target of interest 1 will form its image points away from the image points of the target of interest 1.

Figure 6:
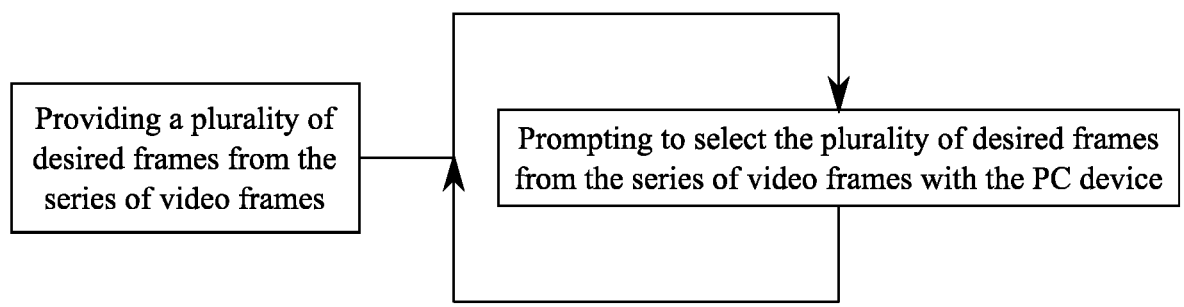
FIG. 6 is a flow chart illustrating a method of obtaining the desired frames.

In the preferred embodiment of the present invention and with reference to FIG. 6, the plurality of desired frames is manually picked from either the entire series of videos frames or a subset of video frames selected from the series of video frames. The subset of video frames can be automatically and intermittently chosen from the series of video frames based on the time stamp or frame count. The PC device prompts to select the plurality of desired frames from the series of frames or subset of video frames.

Figure 7:
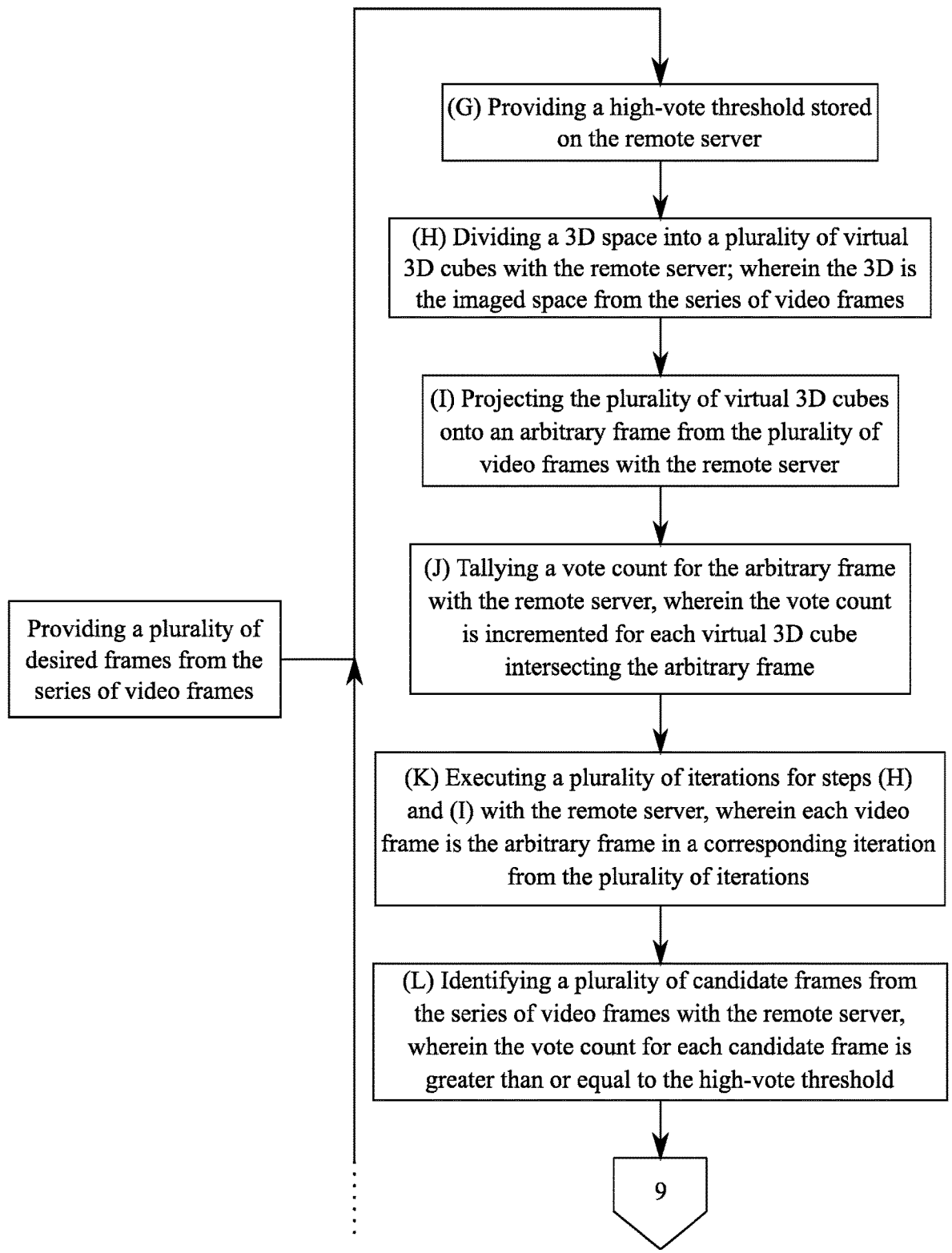
FIG. 7 is a flow chart illustrating a second alternative method of obtaining the desired frames.
Figure 8:
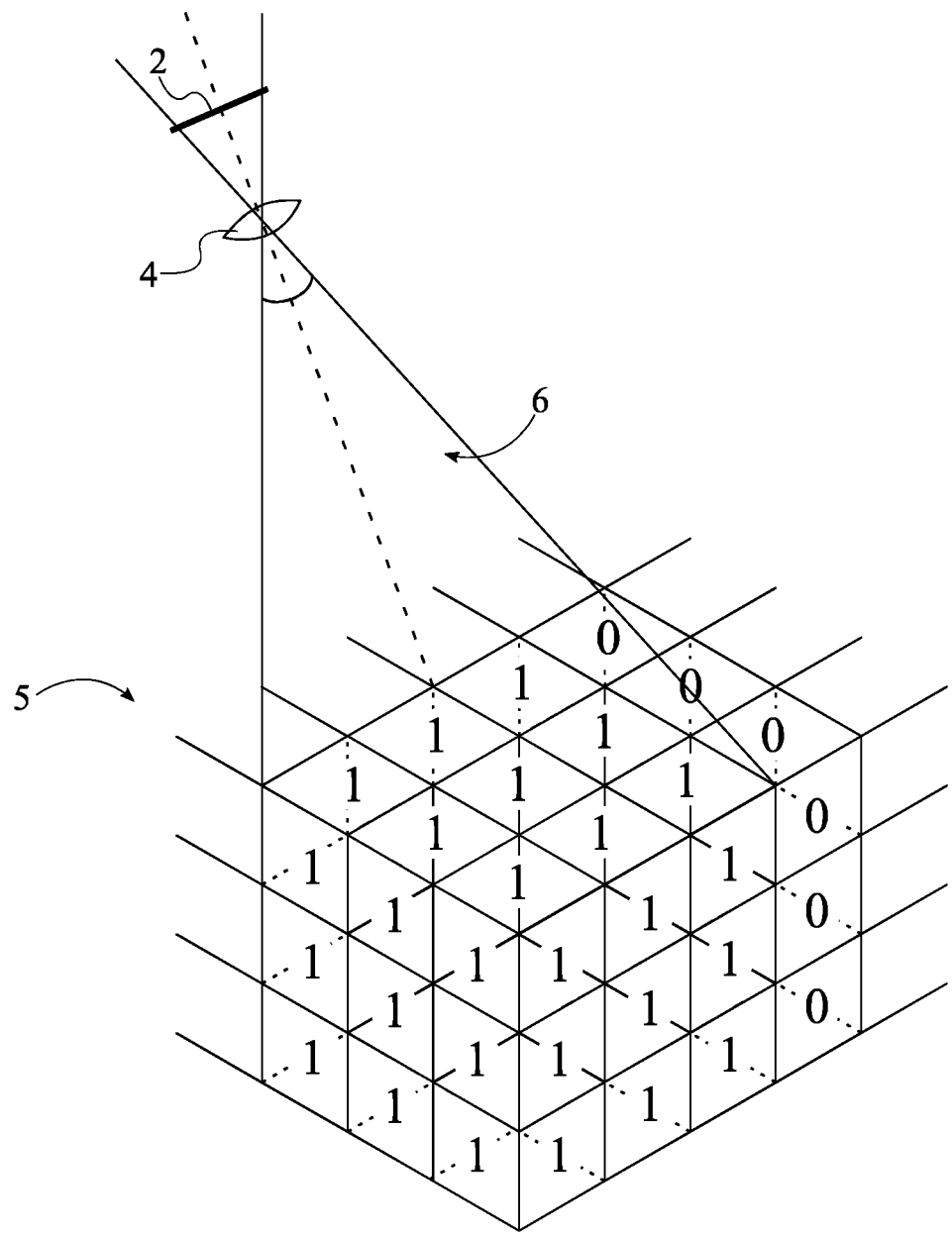
FIG. 8 is a diagram illustrating the method from FIG. 7 of obtaining the desired frames.

With reference to FIG. 7, the plurality of desired frames is automatically picked using the following second alternative method. The sub-process following the method provides a high-vote threshold that is stored on the remote server (Step G). The high-vote threshold is minimum requirement in order to designate a candidate frame for the plurality of desired frames. With reference to FIG. 8, the remote server divides a 3D space into a plurality of virtual 3D cubes 5 (Step H). The 3D space is the imaged space which can be viewed through a video-recording device when recording the series of video frames. The remote server projects the plurality of virtual 3D cubes 5 onto an arbitrary frame from the plurality of video frames (Step I). Virtual 3D cubes 5 which fall into the video-recording device's field of view (FOV) 6 in the arbitrary frame are given a vote. The remote server tallies a vote count for the arbitrary frame (Step J). The vote count is incremented for each virtual 3D cube intersecting the arbitrary frame. The remote server executes a plurality of iterations for Steps H and I (Step K). Each video frame is the arbitrary frame in a corresponding iteration from the plurality of iterations. Finally, the remote server identifies a plurality of candidate frames from the series of video frames (Step L). The vote count for each candidate frame is greater than or equal to the high-vote threshold. In further detail, the 3D space captured by the video-recording device is sliced into the plurality of virtual 3D cubes 5 with the initial voting number for each virtual 3D cube set as 0. For each video-recording device view at a given location, the virtual 3D cubes 5 falling into the video-recording device's FOV 6 are given an extra vote.

Figure 9:
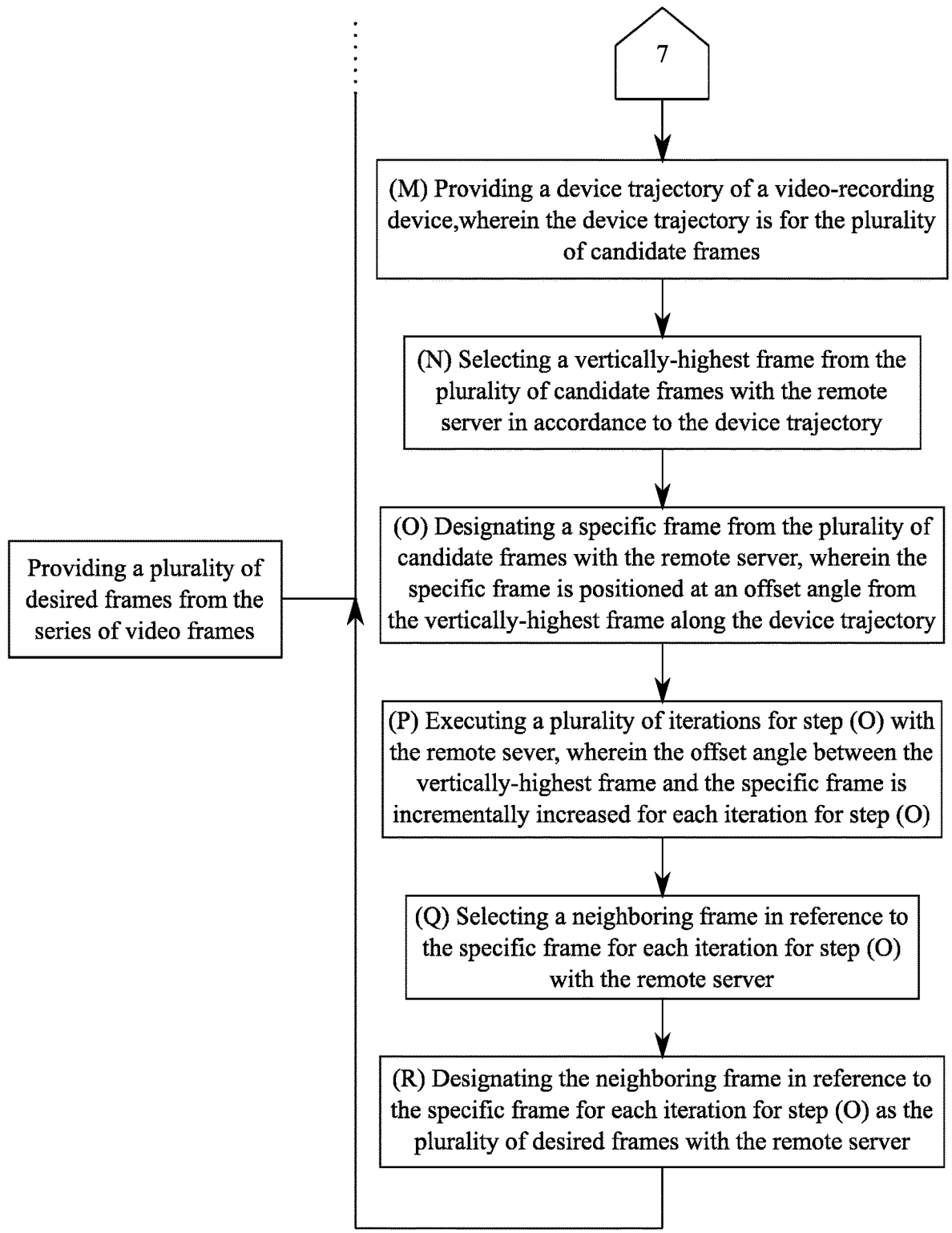
FIG. 9 is a flow chart illustrating is a continuation of the method from FIG. 7 of consequently obtaining the desired frames.
Figure 10:
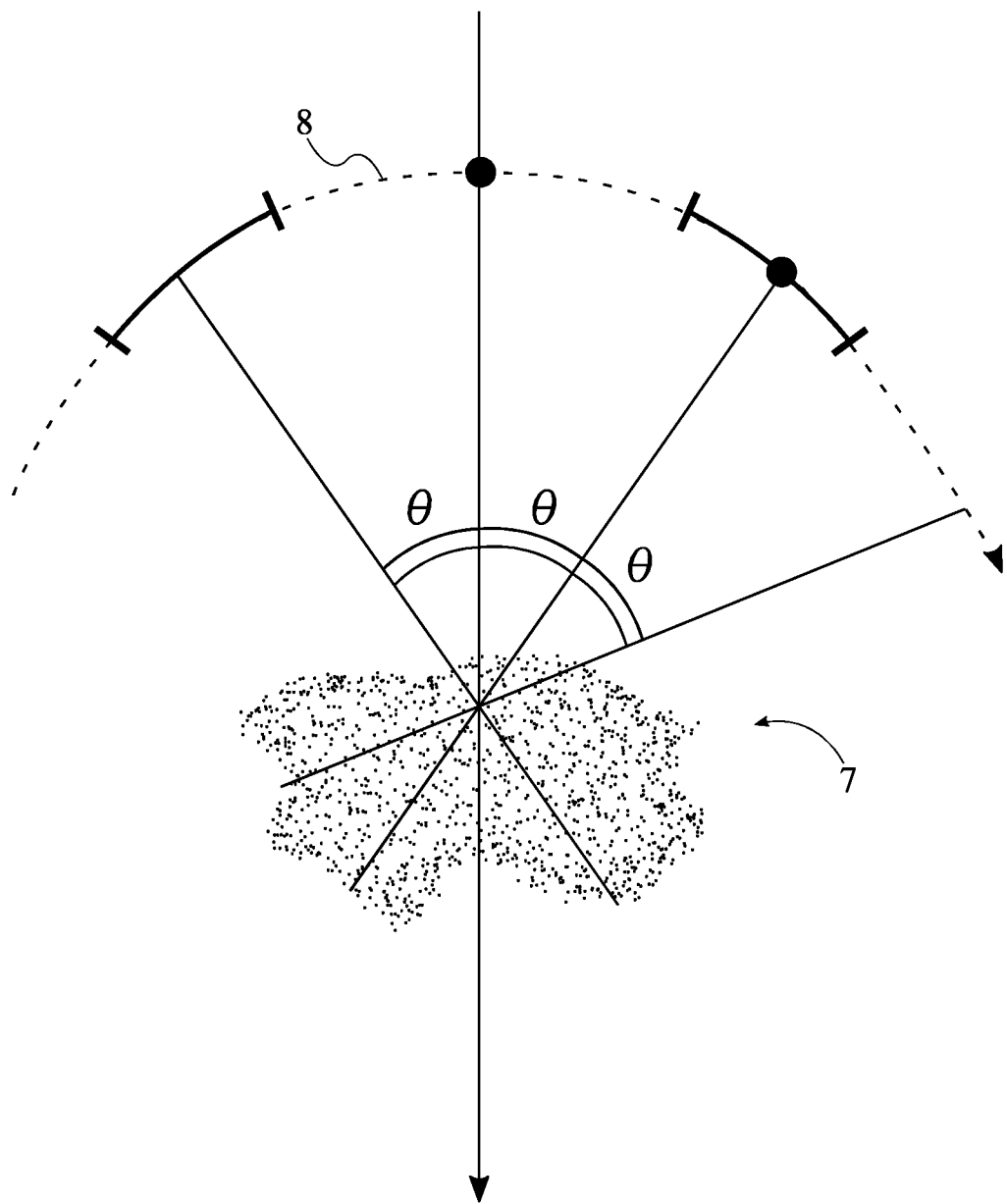
FIG. 10 is a diagram illustrating the method from FIG. 9 of obtaining the desired frames.

With reference to FIGS. 9 and 10, the following method is a continuation of the method previously described in order to automatically pick the desired frames. A device trajectory 8 of the video-recording device is provided (Step M). The device trajectory 8 is the path of the video-recording device when recording the target of interest 1 with accordance to the plurality of candidate frames. The remote server selects a vertically-highest frame from the plurality of candidate frames in accordance with the device trajectory 8 (Step N). In further detail, the remote server picks a frame facing either the north or south direction at the top of the device trajectory 8. Subsequently, the remote server designates a specific frame from the plurality of candidate frames (Step O). The specific frame can be any frame from the plurality of candidate frames and is positioned at an offset angle from the vertically-highest frame along the device trajectory 8. The offset angle may be, but is not limited to, 45 degrees. The remote server then executes a plurality of iterations for Step O, wherein the offset angle between the vertically-highest frame and the specific frame is incrementally increased for each iteration for Step O (Step P). The offset angle may be incrementally increased by, but not limited to, 45 degrees. Moreover, the remote server selects a neighboring frame in reference to the specific frame for each iteration for Step O (Step Q). The neighboring frame may any frame from the series of video frames that is in positioned near the specific frame. The remote server finally designates the neighboring frame in reference to the specific frame for each iteration for Step O as the plurality of desired frames (Step R).

Figure 11A:
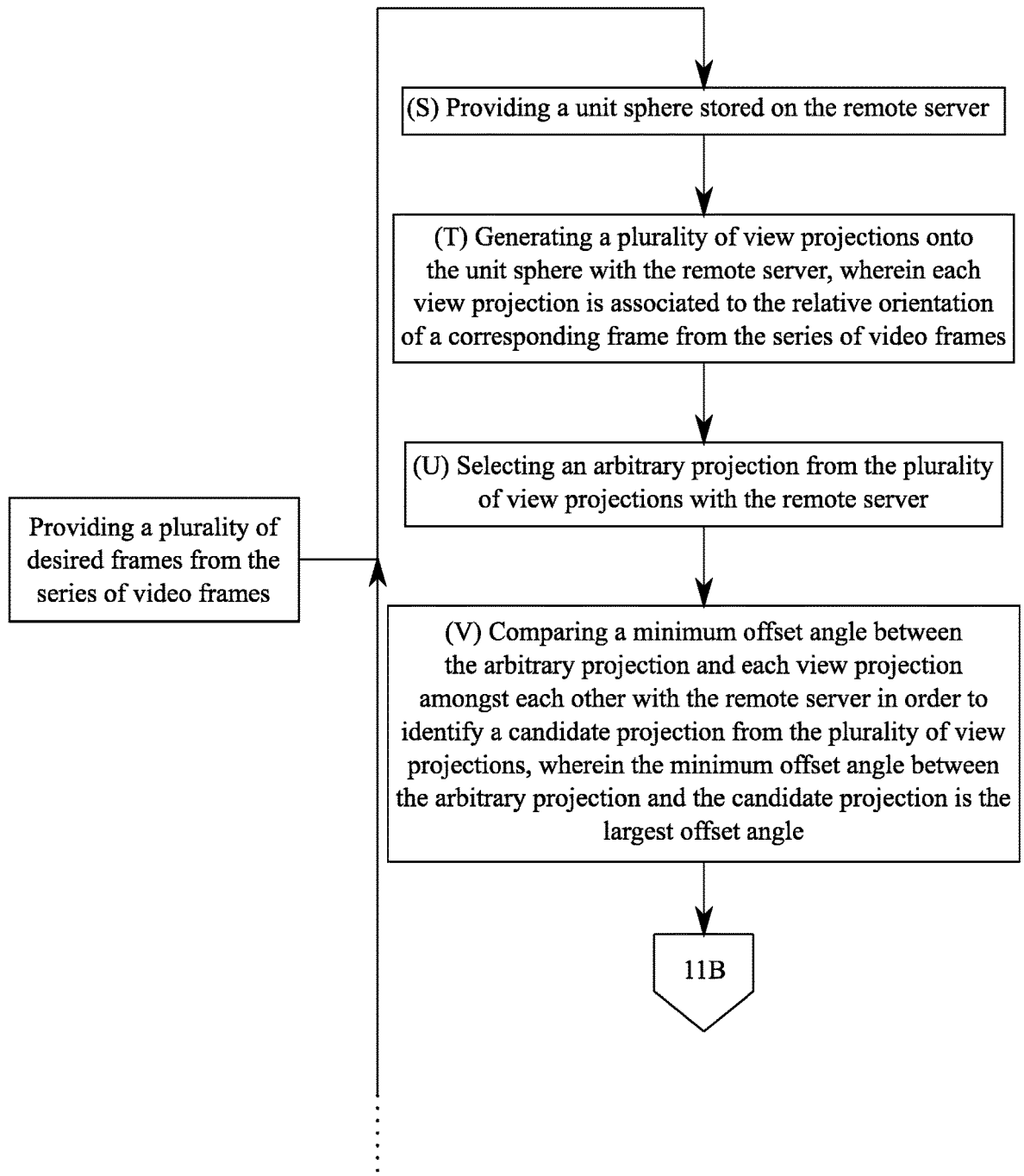
FIG. 11A is a flow chart illustrating a third alternative method of obtained the desired frames.
Figure 11B:
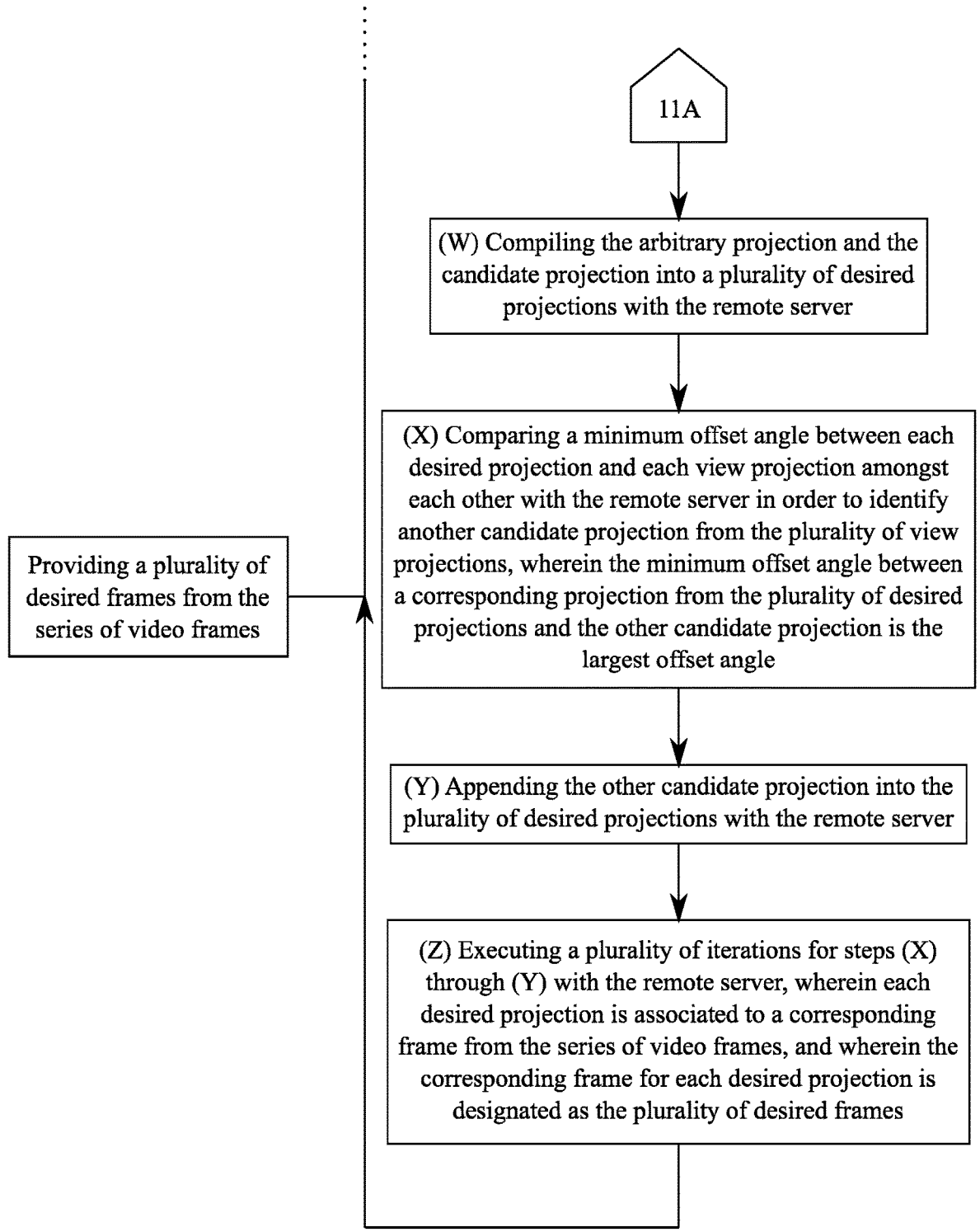
FIG. 11B is a continuation of the flow chart from FIG. 11A.
Figure 12:
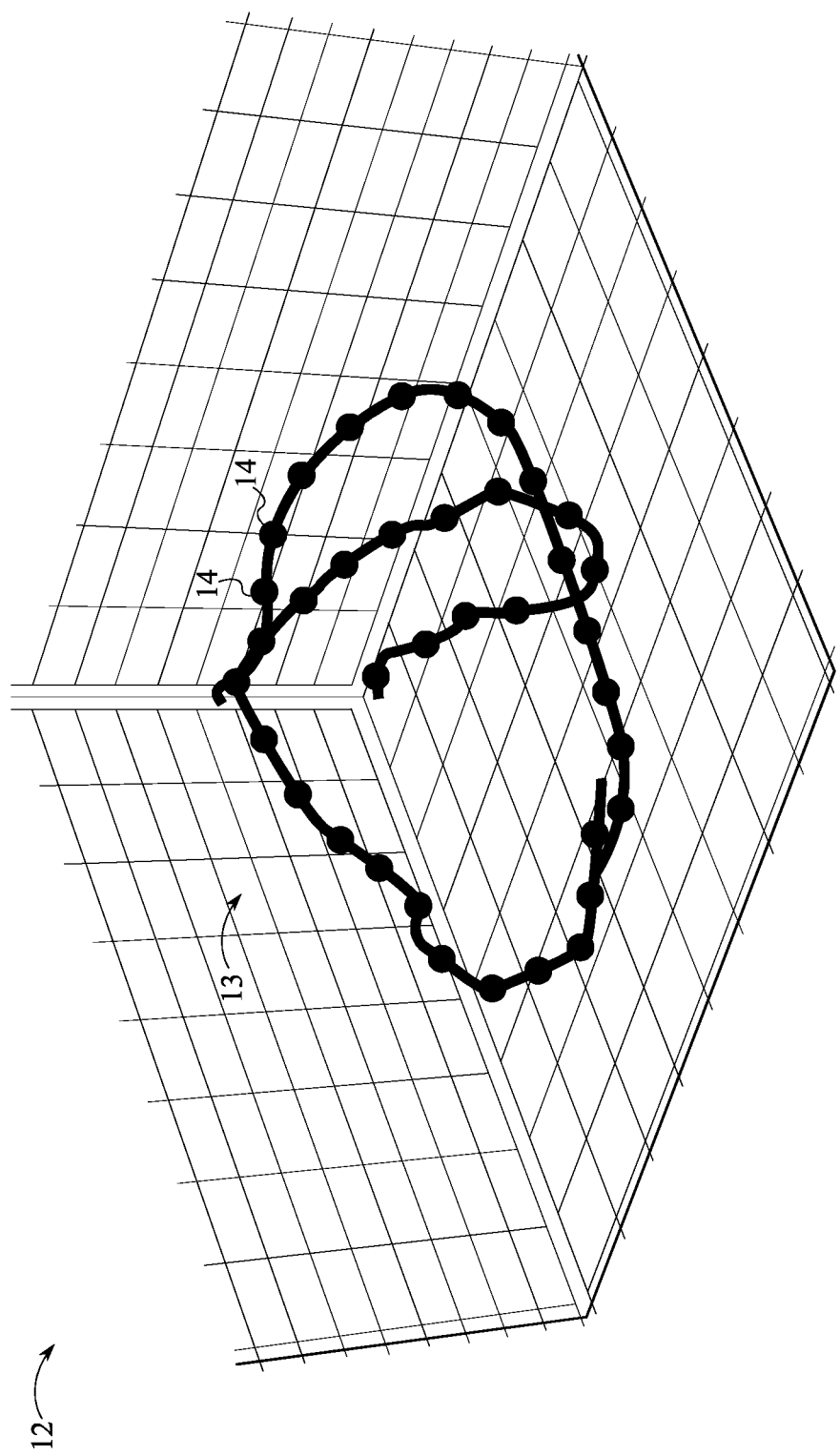
FIG. 12 is a diagram illustrating the method from FIGS. 11A and 11B of obtaining the desired frames.

With reference to FIGS. 11A, 11B, and 12, the plurality of desired frames is automatically picked using the following third alternative method. A unit sphere 12 is provided to be stored on the remote server (Step S). The unit sphere 12 is a closed-off set of points of distance one from a fixed central point. The remote server generates a plurality of view projections 13 onto the unit sphere 12. Each view projection is associated to the relative orientation of a corresponding frame from the series of video frames (Step T). The remote server then selects an arbitrary projection from the plurality of view projections 13 (Step U). The remote server compares a minimum offset angle between the arbitrary projection and each view projection amongst each other in order to identify a candidate projection from the plurality of view projections 13, wherein the minimum offset angle between the arbitrary projection and the candidate projection is the largest offset angle (Step V). In further detail, the remote server computes the minimum offset angle or minimum angle difference between the arbitrary projection and each view projection and selects the candidate projection which gives the largest offset angle or maximum angle difference with respect to the arbitrary projection.

The remote server compiles the arbitrary projection and the candidate projection into a plurality of desired projections 14 (Step W). The remote server compares a minimum offset angle between each desired projection and each view projection amongst each other in order to identify another candidate projection from the plurality of view projections 13, wherein the minimum offset angle between a corresponding projection from the plurality of desired projections 14 and the other candidate projection is the largest offset angle (Step X). In further detail, the remote server computes the minimum offset angle or minimum angle difference between each desired projection and each view projection and selects the candidate projection which gives the largest offset angle or maximum angle difference with respect to the corresponding projection from the plurality of desired projections 14. The remote server appends the other candidate projection into the plurality of desired projections 14 (Step Y). The remote server executes a plurality of iterations for Steps X through Y with the remote server, wherein each desired projection is associated to a corresponding frame from the series of video frames, and wherein the corresponding frame for each desired projection is designated as the plurality of desired frames (Step Z). In further detail, each corresponding frame of each candidate projection, which gives the largest offset angle or maximum angle difference selected from the iterations from Steps X through Y, is used a desired frame for the plurality of desired frames. The following description represents the algorithm used for this alternative method.

Figure 13:
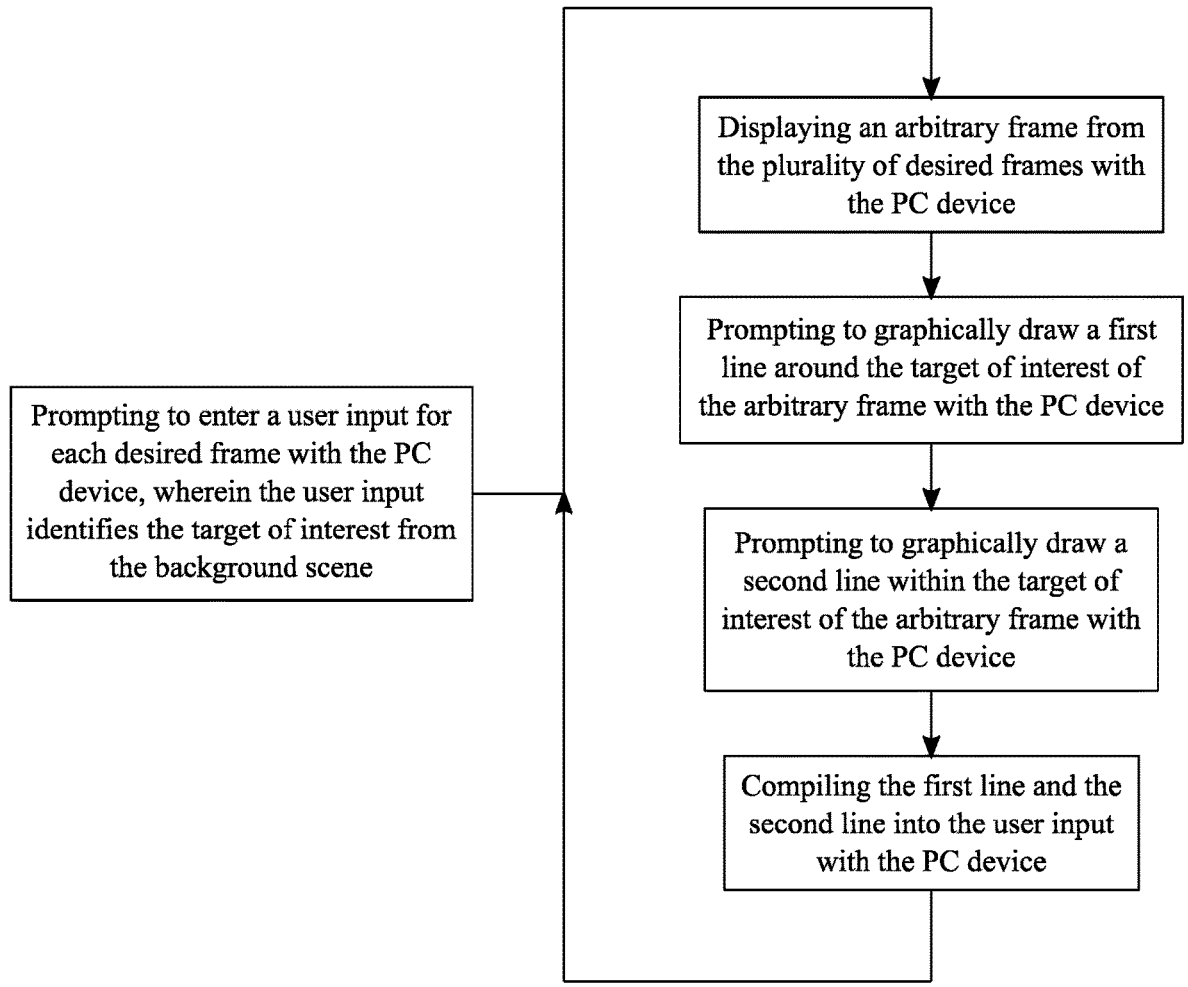
FIG. 13 is a flow chart illustrating the sub-process of the user input.
Figure 14:
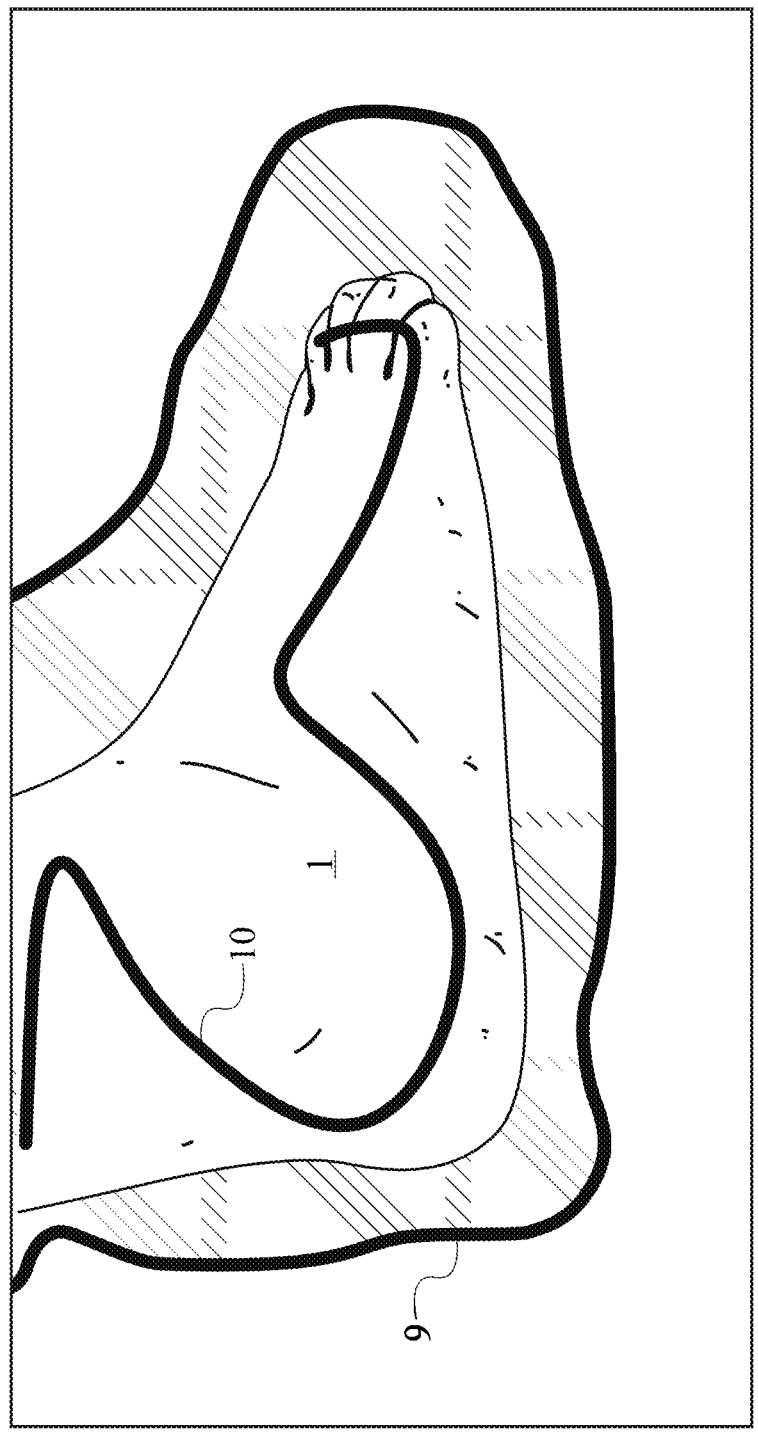
FIG. 14 is a diagram illustrating the user input on a target of interest.

Algorithm:
INPUT: A set of camera viewpoints T with cardinality of M, N<<M where N as the desired number viewpoints to be selected for R $R \leftarrow v_0$
While $|R|<N$ do {
    $D_i = \min_{v_2 \in R}(\|v_i - v_j\|_2), \forall v_i \in T$
    $R \leftarrow \arg_{v_i} \max(D_i)\}$ OUTPUT: Selected camera view or image frame set R with cardinality of N With reference to FIG. 13, the sub-process following the method isolates the target of interest 1 from the background scene. The PC device displays an arbitrary frame from the plurality of desired frames. In order to properly identify the target of interest 1 and with reference to FIG. 14, the PC device prompts to graphically draw a first line 9 around the target of interest 1 of the arbitrary frame. Subsequently, the PC device prompts to graphically draw a second line 10 within the target of interest 1 of the arbitrary frame. The PC device compiles the first line 9 and the second line 10 into the user input. With the user input, the remote server properly identifies the target of interest 1 from the background scene.

Figure 15:
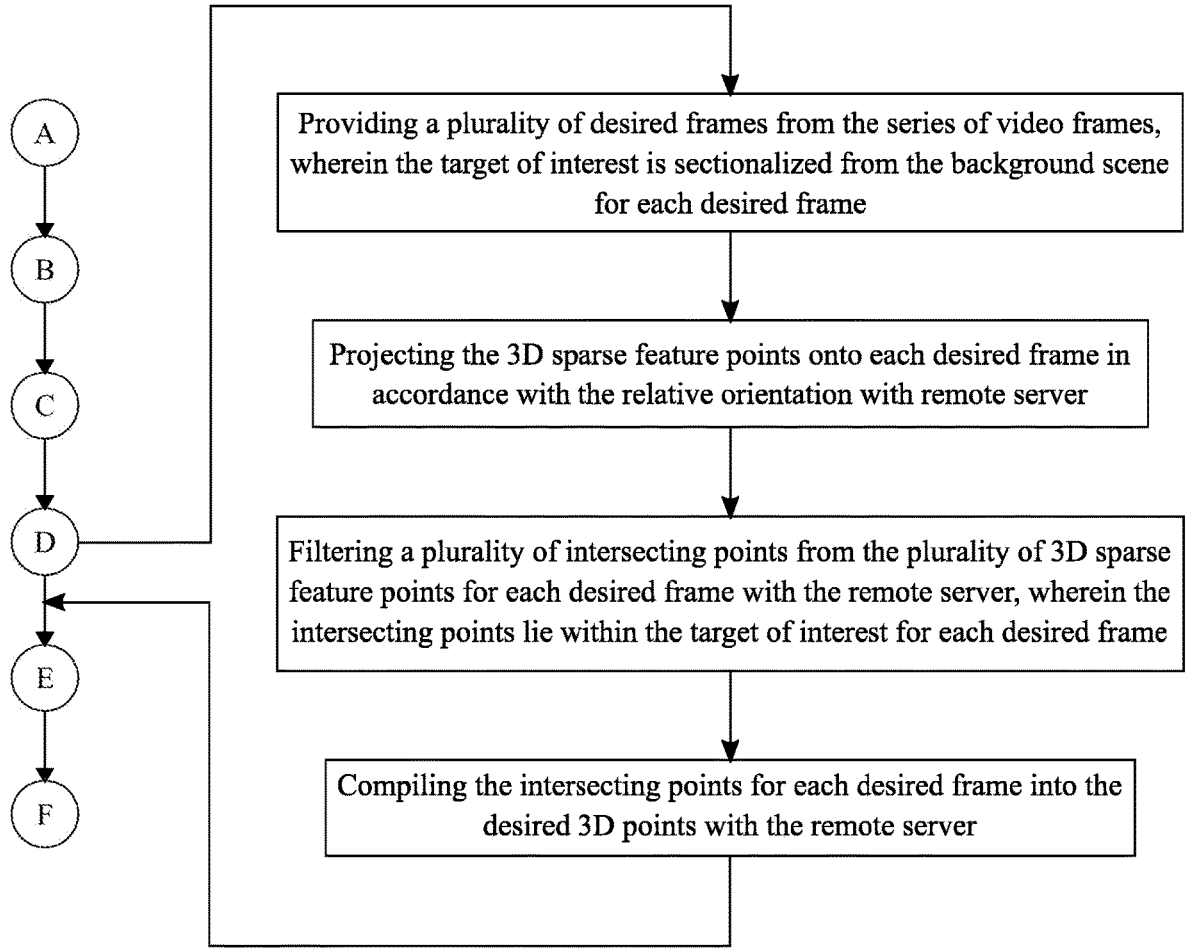
FIG. 15 is a flow chart illustrating the sub-process of obtaining the desired 3D points.
Figure 16:
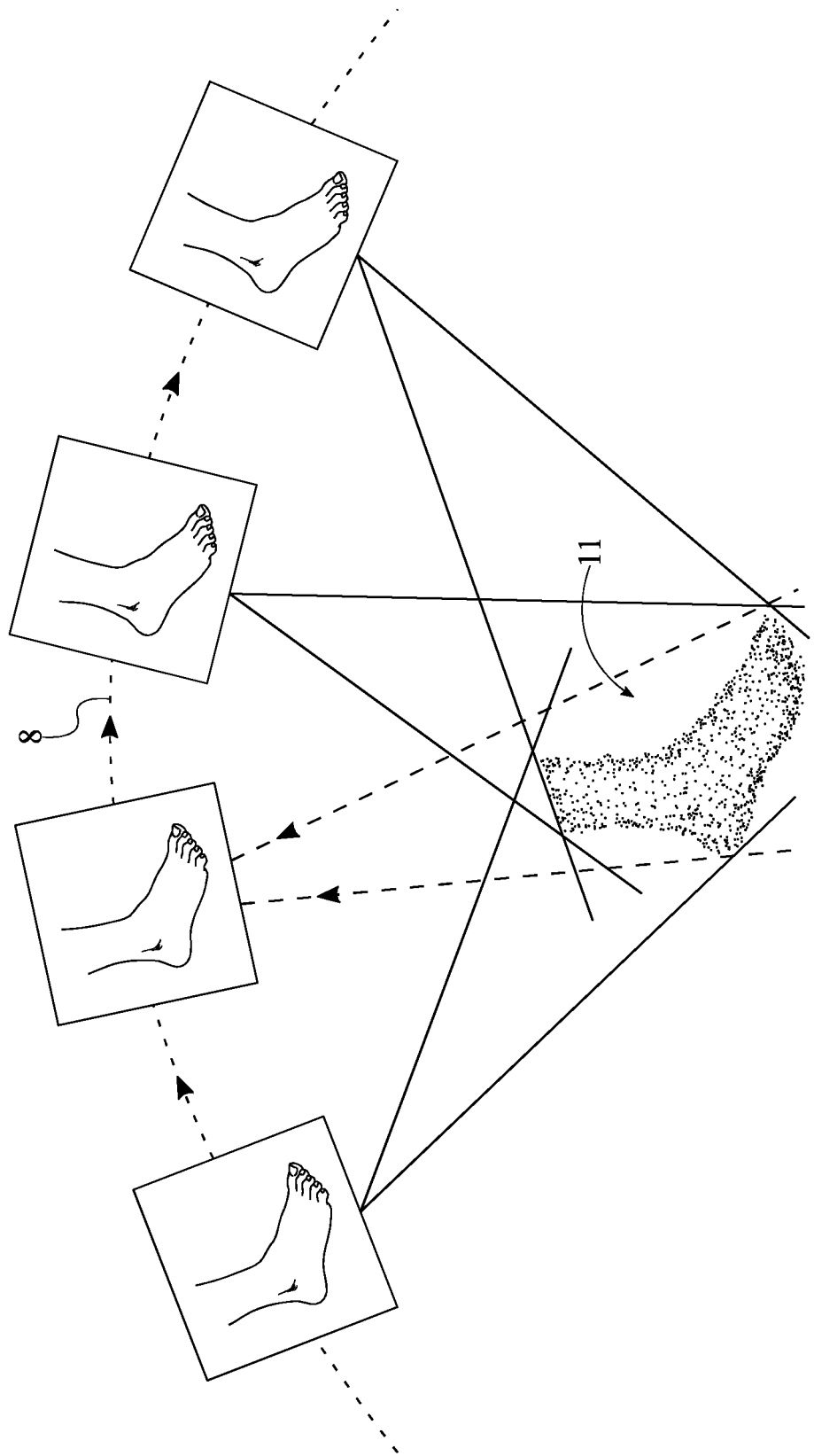
FIG. 16 is a diagram illustrating 3D to 2D projection of the desired 3D points from the desired frames.

With reference to FIG. 15, the sub-process following the method provides the desired 3D points 11 from the series of video frames. The target of interest 1 is sectionalized from the background scene for each desired frame. As mentioned previously, the remote server uses GrabCut to sectionalize the target of interest 1 from the background scene. With reference to FIG. 16, the remote server projects the 3D sparse feature points 7 onto each desired frame in accordance with the relative orientation. In more detail, the 3D sparse feature points 7 are projected onto each desired frame which are 2D frames. The remote server filters a plurality of intersecting points from the plurality of 3D sparse feature points 7 for each desired frame. The intersecting points lie within the target of interest 1 for each desired frame using the optical ray tracing principle. The remote server compiles the intersecting points for each desired frame into the desired 3D points 11. In more detail, for all the 3D sparse feature points 7 projected onto each video frame, using the relative orientation, 2D feature image points of the target of interest 1 are obtained from the particular frame.

Figure 17:
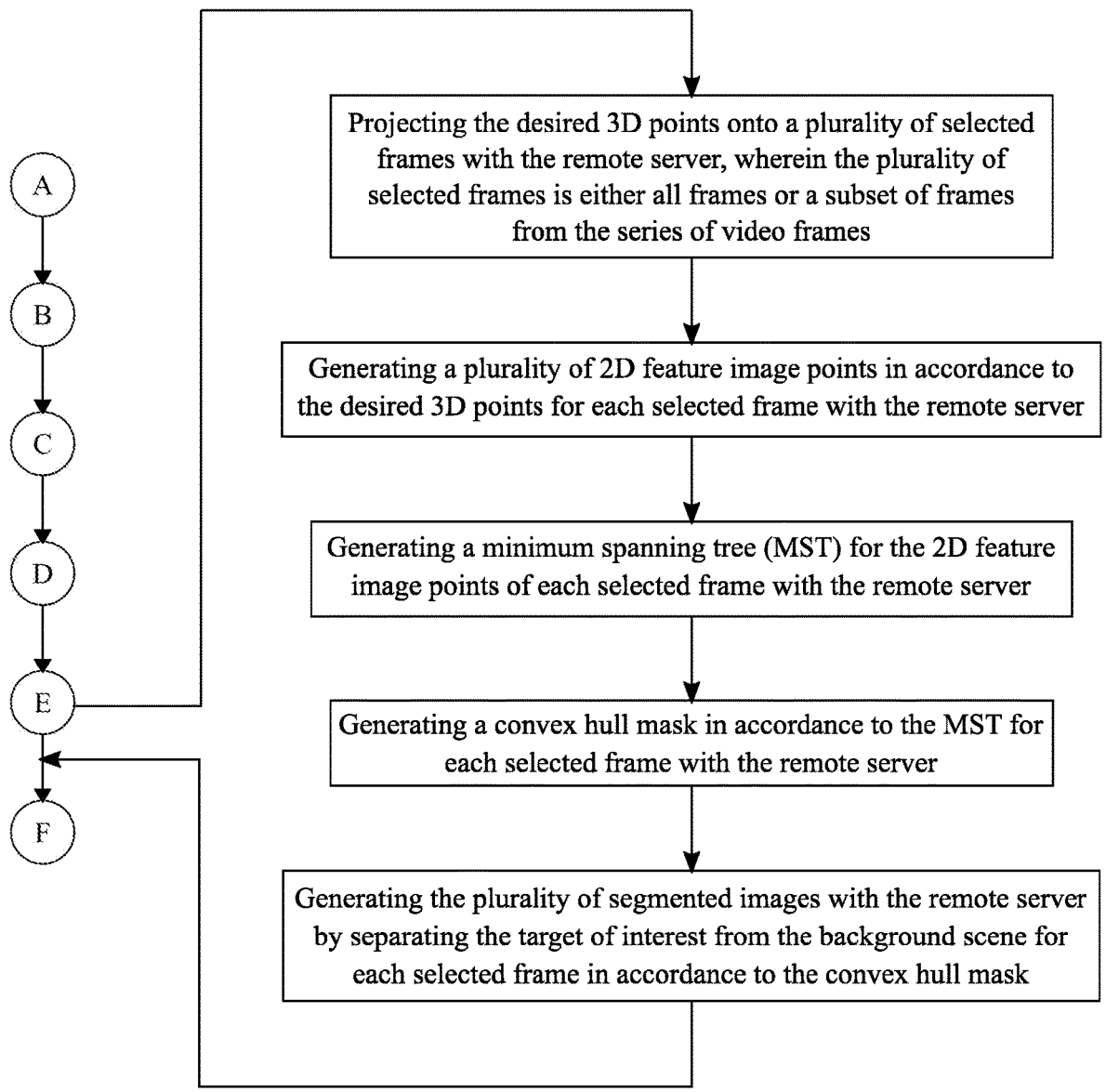
FIG. 17 is a flow chart illustrating the sub-process of obtaining segmented images.
Figure 18:
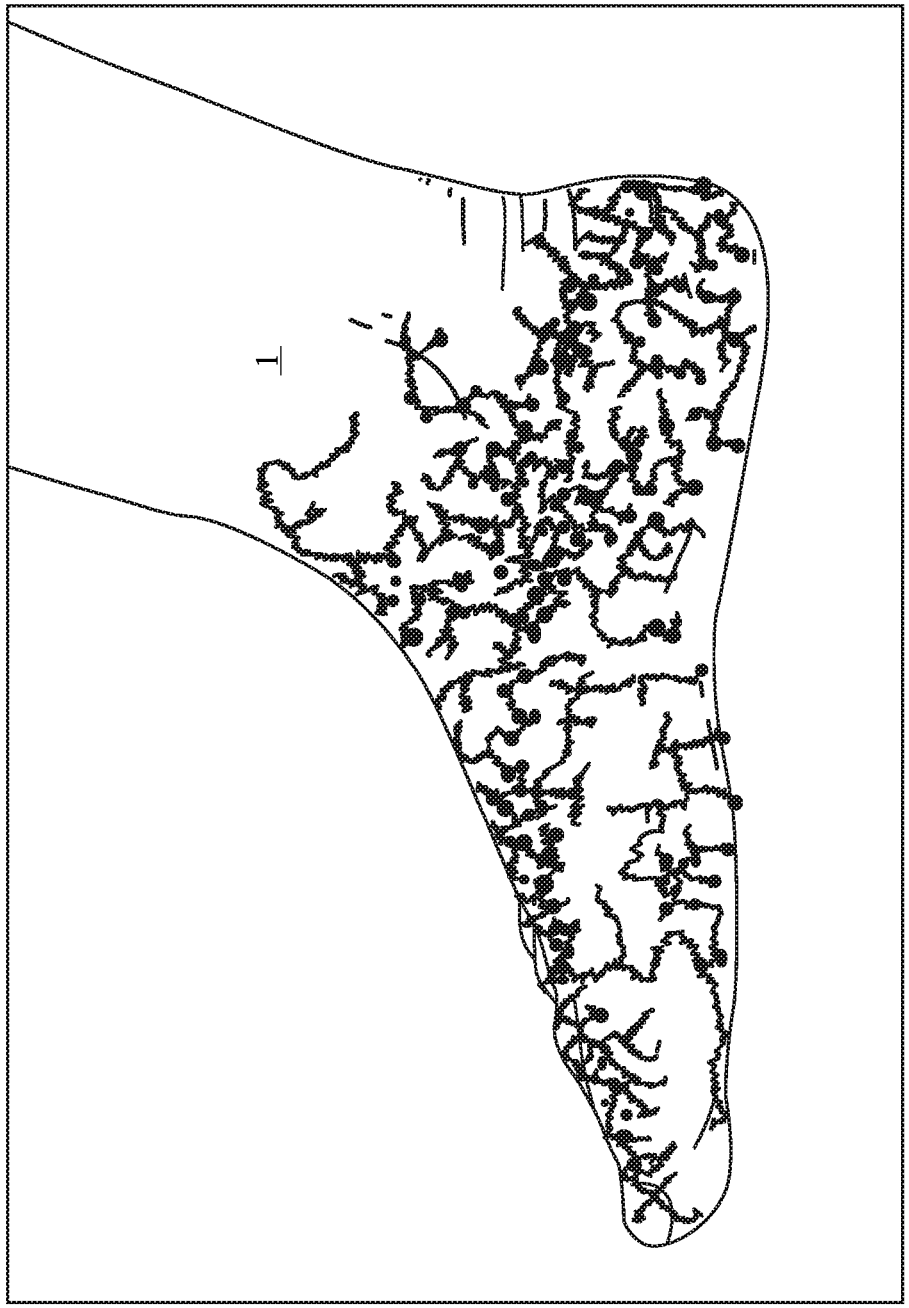
FIG. 18 is a diagram illustrating the minimum spanning tree (MST) applied to the 2D feature image points on a target of interest.
Figure 19:
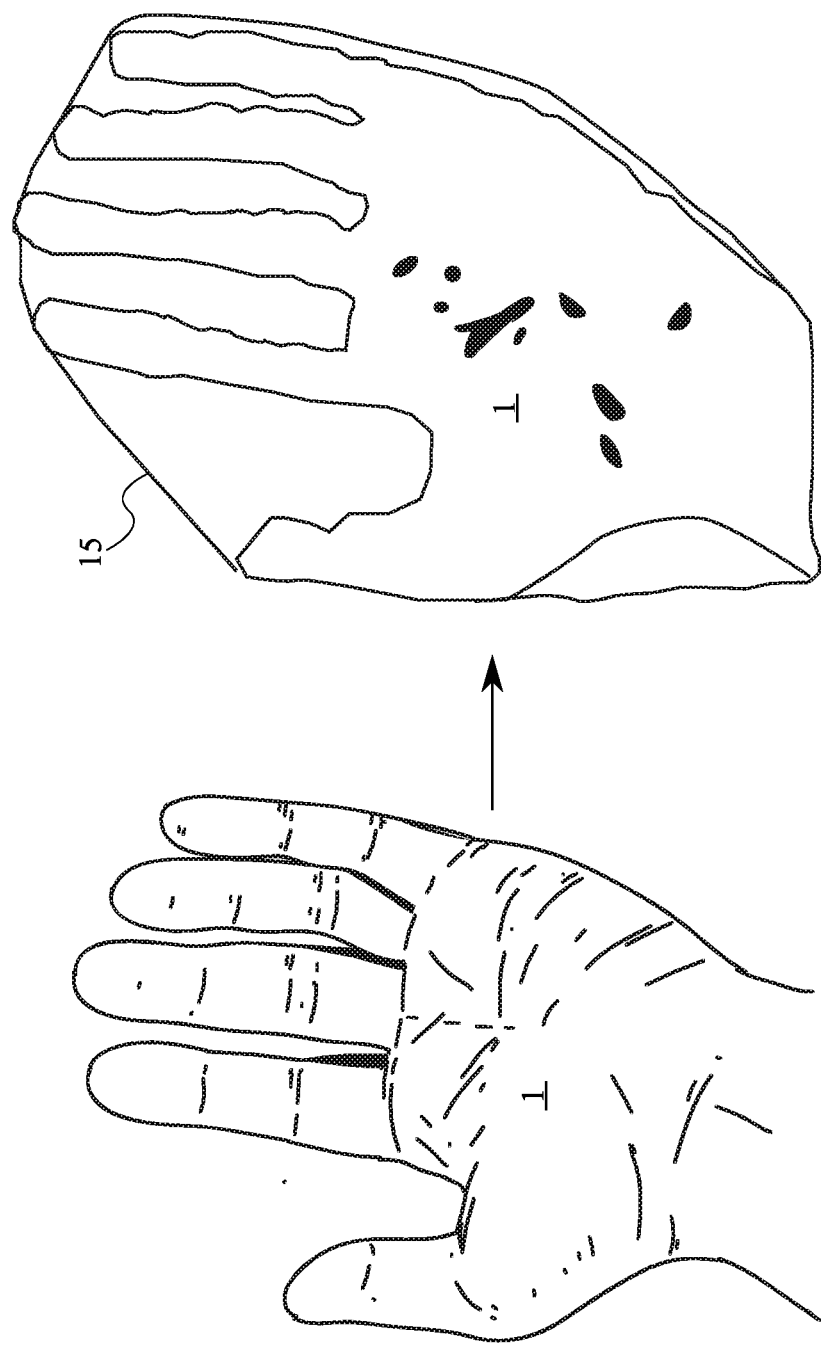
FIG. 19 is a diagram illustrating the convex hull mask.

With reference to FIG. 17, the sub-process following the method generates the plurality of segmented images. The remote server projects the desired 3D points 11 onto a plurality of selected frames. The plurality of selected frames is either all frames or a subset of frames from the series of video frames. The subset of video frames can specifically be the desired frames automatically picked using the third alternative method. The remote server generates a plurality of 2D feature image points in accordance to the desired 3D points 11 for each selected frame. With reference to FIG. 18, the remote server generates a minimum spanning tree (MST) for the 2D feature image points of each selected frame. The MST is a subset of the edges of a connected, edge-weighted (un)directed graph that connects all the vertices together, without any cycles and with the minimum possible total edge weight. The remote server generates a convex hull mask 15 in accordance to the MST for each selected frame. With reference to FIG. 19, the convex hull mask 15 of the MST is the smallest convex region enclosing the MST. The remote server generates the plurality of segmented images by separating the target of interest 1 from the background scene for each selected frame in accordance to the convex hull mask 15. GrabCut is used to generate the plurality of segmented images in accordance to the convex hull mask 15. Finally, the remote server generates the dense 3D reconstruction of the target of interest 1 by executing the traditional SFM reconstruction process on the segmented images.

Figure 20:
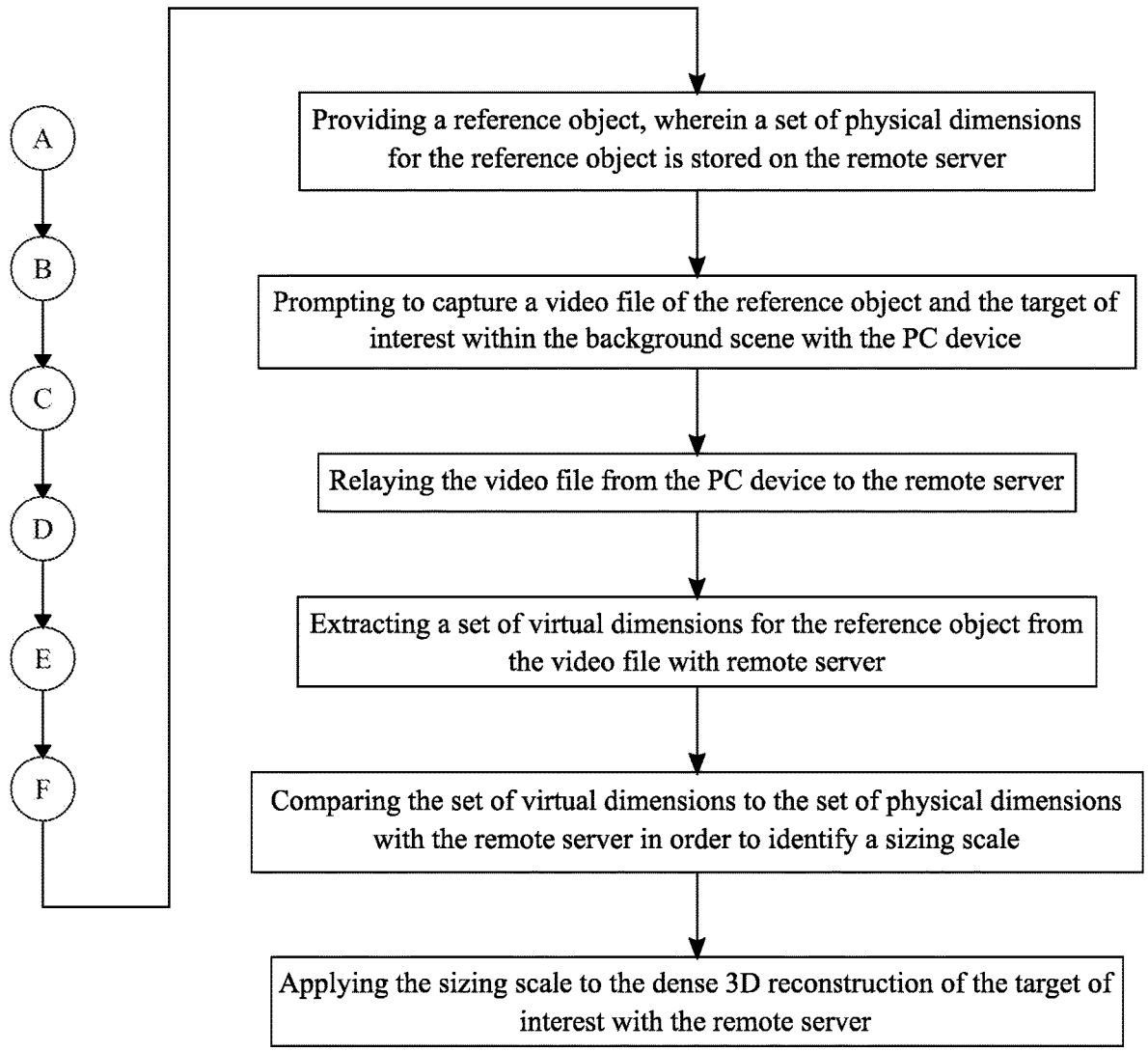
FIG. 20 is a flow chart illustrating the sub-process of obtaining a sizing scale.

With reference to FIG. 20, the sub-process following the method allows the 3D scale of the target of interest 1 to be recovered and provides a reference object. A set of physical dimensions for the reference object is stored on the remote server. The physical dimensions are the measurements of the physical borders of the reference object. The PC device prompts to capture a video file of the reference object and the target of interest 1 within the background scene after Step F. The video file is relayed from the PC device to the remote server. The remote server extracts a set of virtual dimensions for the reference object from the video file. The set of physical dimensions and the set of virtual dimensions for the reference object are obtained using the 3D reconstruction from stereo or triangulation principle. The remote server compares the set of virtual dimensions to the set of physical dimensions in order to identify a sizing scale. The remote server applies the sizing scale to the dense 3D reconstruction of the target of interest 1.

Figure 21:
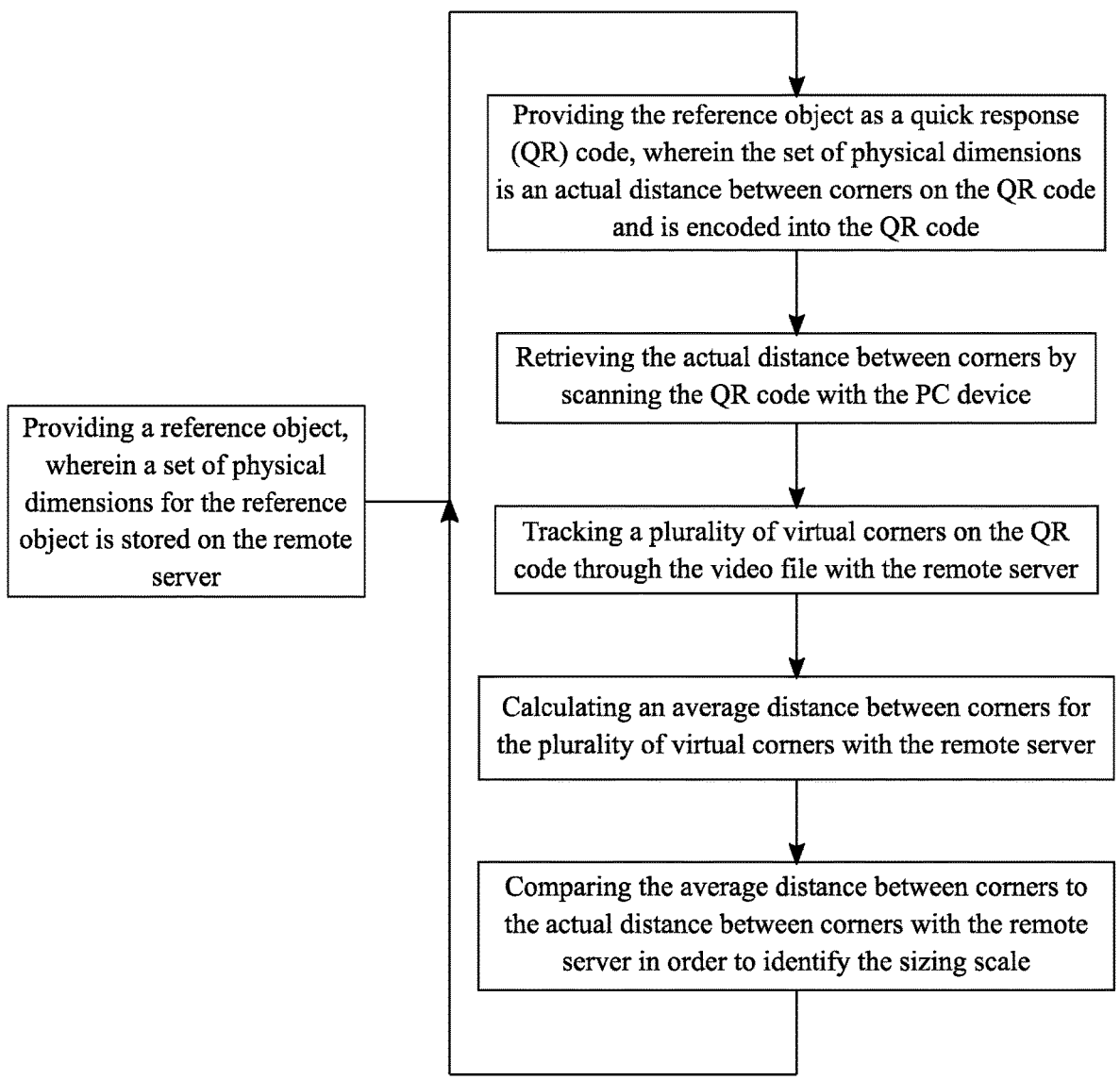
FIG. 21 is a flow chart illustrating the sub-process of using a quick response (QR) code to obtain the sizing scale.

With reference to FIG. 21, the sub-process following the method provides the reference object as a quick response (QR) code. The set of physical dimensions is an actual distance between corners on the QR code and is encoded into the QR code. The PC device retrieves the actual distance between corners by scanning the QR code. The remote server tracks a plurality of corners on the QR code through the video file. The plurality of corners includes 3 physical corners and one virtual corner on the QR code. The remote server calculates an average distance between corners for the plurality of corners. The remote server compares the average distance between corners to the actual distance between corners in order to identify the sizing scale. Finally, the 3D dense reconstruction generated from Step F is re-scaled using the sizing scale.

In another embodiment of the present invention, the present invention can be processed directly on the PC device without the use of the remote server. Any information would be directly stored on the PC device to be later accessed and used for the processes of the present invention. If the PC device includes an integrated video-recording device, the PC device can be used to record the series of video frames for the processes of the present invention.

Although the invention has been explained in relation to its preferred embodiment, it is to be understood that many other possible modifications and variations can be made without departing from the spirit and scope of the invention as hereinafter claimed.

What is claimed is:

1. A method of discriminative recovery of three-dimensional digital data of a target of interest in a cluttered or controlled environment, the method comprises the steps of:
    (A) providing a personal computing (PC) device, and at least one remote server, wherein the remote server manages a three-dimensional (3D) reconstruction process;
    (B) providing a stereo 3D reconstruction for a target of interest within a background scene, wherein the stereo 3D reconstruction is compiled from a series of video frames, and wherein each video frame includes a relative orientation;
    (C) tracking a plurality of 3D sparse feature points of the stereo 3D reconstruction with the remote server;
    (D) filtering a plurality of desired 3D points from the plurality of 3D sparse feature points with the remote server;
    providing a plurality of desired frames from the series of video frames;
    (M) providing a plurality of candidate frames and a device trajectory of a video-recording device, wherein the plurality of candidate frames is from the series of video frames, and wherein the series of video frames is captured by the video-recording device;
    (N) selecting a vertically-highest frame from the plurality of candidate frames with the remote server in accordance to the device trajectory;
    (O) designating a specific frame from the plurality of candidate frames with the remote server, wherein the specific frame is positioned at an offset angle from the vertically-highest frame along the device trajectory;
    (P) executing a plurality of iterations for step (O) with the remote sever, wherein the offset angle between the vertically-highest frame and the specific frame is incrementally increased for each iteration for step (O);
    (Q) selecting a neighboring frame in reference to the specific frame for each iteration for step (O) with the remote server;
    (R) designating the neighboring frame in reference to the specific frame for each iteration for step (O) as the plurality of desired frames with the remote server;
    prompting to select the plurality of desired frames from the series of video frames with the PC device;
    prompting to enter a user input for each desired frame with the PC device, wherein the user input identifies the target of interest from the background scene;
    relaying the desired frames and the user input for each desired frame from the PC device to the remote server;
    segmenting the target of interest from the background scene for each desired frame in accordance with the user input with the remote server;
    (E) generating a plurality of segmented images with the remote server by separating the target of interest from the background scene for each video frame in relation to the desired 3D points, wherein each segmented image is associated to a corresponding frame from the series of video frames; and
    (F) executing the 3D reconstruction process with the remote server in order to generate a dense 3D reconstruction of the target of interest by inputting the segmented images and the relative orientation of the corresponding frame.

2. The method of discriminative recovery of three-dimensional digital data of a target of interest in a cluttered or controlled environment, the method as claimed in claim 1 comprises the steps of:
    (G) providing a high-vote threshold stored on the remote server;
    (H) dividing a 3D space into a plurality of virtual 3D cubes with the remote server, wherein the 3D space is from the series of video frames;
    (I) projecting the plurality of virtual 3D cubes onto an arbitrary frame from the plurality of video frames with the remote server;

(J) tallying a vote count for the arbitrary frame with the remote server, wherein the vote count is incremented for each virtual 3D cube intersecting the arbitrary frame;

(K) executing a plurality of iterations for steps (H) and (I) with the remote server, wherein each video frame is the arbitrary frame in a corresponding iteration from the plurality of iterations; and (L) identifying a plurality of candidate frames from the series of video frames with the remote server, wherein the vote count for each candidate frame is greater than or equal to the high-vote threshold.

3. The method of discriminative recovery of three-dimensional digital data of a target of interest in a cluttered or controlled environment, the method as claimed in claim 1 comprises the steps of:

(S) providing a unit sphere stored on the remote server;

(T) generating a plurality of view projections onto the unit sphere with the remote server, wherein each view projection is associated to the relative orientation of a corresponding frame from the series of video frames;

(U) selecting an arbitrary projection from the plurality of view projections with the remote server;

(V) comparing a minimum offset angle between the arbitrary projection and each view projection amongst each other with the remote server in order to identify a candidate projection from the plurality of view projections, wherein the minimum offset angle between the arbitrary projection and the candidate projection is the largest offset angle;

(W) compiling the arbitrary projection and the candidate projection into a plurality of desired projections with the remote server;

(X) comparing a minimum offset angle between each desired projection and each view projection amongst each other with the remote server in order to identify another candidate projection from the plurality of view projections, wherein the minimum offset angle between a corresponding projection from the plurality of desired projections and the other candidate projection is the largest offset angle;

(Y) appending the other candidate projection into the plurality of desired projections with the remote server; and (Z) executing a plurality of iterations for steps (X) through (Y) with the remote server, wherein each desired projection is associated to a corresponding frame from the series of video frames, and wherein the corresponding frame for each desired projection is designated as the plurality of desired frames.

4. The method of discriminative recovery of three-dimensional digital data of a target of interest in a cluttered or controlled environment, the method as claimed in claim 1 comprises the steps of:

displaying an arbitrary frame from the plurality of desired frames with the PC device;

prompting to graphically draw a first line around the target of interest of the arbitrary frame with the PC device;

prompting to graphically draw a second line within the target of interest of the arbitrary frame with the PC device; and compiling the first line and the second line into the user input with the PC device.

5. The method of discriminative recovery of three-dimensional digital data of a target of interest in a cluttered or controlled environment, the method as claimed in claim 1 comprises the steps of:

providing a plurality of desired frames from the series of video frames, wherein the target of interest is sectionalized from the background scene for each desired frame;

projecting the 3D sparse feature points onto each desired frame in accordance with the relative orientation with remote server;

filtering a plurality of intersecting points from the plurality of 3D sparse feature points for each desired frame with the remote server, wherein the intersecting points lie within the target of interest for each desired frame; and compiling the intersecting points for each desired frame into the desired 3D points with the remote server.

6. The method of discriminative recovery of three-dimensional digital data of a target of interest in a cluttered or controlled environment, the method as claimed in claim 1 comprises the steps of:

projecting the desired 3D points onto a plurality of selected frames with the remote server, wherein the plurality of selected frames is either all frames or a subset of frames from the series of video frames;

generating a plurality of 2D feature image points in accordance to the desired 3D points for each selected frame with the remote server;

generating a minimum spanning tree (MST) for the 2D feature image points of each selected frame with the remote server;

generating a convex hull mask in accordance to the MST for each selected frame with the remote server; and generating the plurality of segmented images with the remote server by separating the target of interest from the background scene for each selected frame in accordance to the convex hull mask.

7. The method of discriminative recovery of three-dimensional digital data of a target of interest in a cluttered or controlled environment, the method as claimed in claim 1 comprises the steps of:

providing a reference object, wherein a set of physical dimensions for the reference object is stored on the remote server;

prompting to capture a video file of the reference object and the target of interest within the background scene with the PC device after step (F);

relaying the video file from the PC device to the remote server;

extracting a set of virtual dimensions for the reference object from the video file with remote server;

comparing the set of virtual dimensions to the set of physical dimensions with the remote server in order to identify a sizing scale; and applying the sizing scale to the dense 3D reconstruction of the target of interest with the remote server.

8. The method of discriminative recovery of three-dimensional digital data of a target of interest in a cluttered or controlled environment, the method as claimed in claim 7 comprises the steps of:

providing the reference object as a quick response (QR) code, wherein the set of physical dimensions is an actual distance between corners on the QR code and is encoded into the QR code;

retrieving the actual distance between corners by scanning the QR code with the PC device;

tracking a plurality of corners on the QR code through the video file with the remote server;

calculating an average distance between corners for the plurality of corners with the remote server; and comparing the average distance between corners to the actual distance between corners with the remote server in order to identify the sizing scale.

\* \* \* \* \*